United States Patent [19]

Levy et al.

[11] Patent Number: 5,408,565
[45] Date of Patent: Apr. 18, 1995

[54] THIN-FILM MAGNETO-OPTIC POLARIZATION ROTATOR

[75] Inventors: Miguel Levy; Richard M. Osgood, both of New York, N.Y.

[73] Assignee: The Trustees of Columbia University in the City of New York, Morningside Heights, N.Y.

[21] Appl. No.: 20,362

[22] Filed: Feb. 22, 1993

[51] Int. Cl.$^6$ .............................................. G02B 6/10
[52] U.S. Cl. ...................... 385/130; 385/6; 385/131
[58] Field of Search ...................... 385/6, 11, 31, 129, 385/130, 131, 142

[56] References Cited

U.S. PATENT DOCUMENTS

| | | | |
|---|---|---|---|
| 3,860,325 | 1/1975 | Matsushita et al. | 385/6 |
| 4,047,801 | 9/1977 | Challeton et al. | 385/130 |
| 4,112,367 | 9/1978 | Hepner et al. | 385/130 |
| 4,712,855 | 12/1987 | Tolksdorf | 385/129 |
| 4,886,332 | 12/1989 | Wolfe | 385/11 |
| 4,952,014 | 8/1990 | Lieberman et al. | 385/11 |
| 4,973,119 | 11/1990 | Taki | 385/130 |
| 5,031,983 | 7/1991 | Dillon et al. | 385/11 |
| 5,101,469 | 3/1982 | Oda | 385/131 |

OTHER PUBLICATIONS

K. Matsuda et al., "Magnetless Faraday Rotator of (BiY)$_3$Fe$_5$O$_{12}$ Waveguide with Strip Magnetic Domains", Applied Physics Letters, vol. 59, 1991, pp. 507–509.

R. Wolfe et al., "Etch–tuned Ridged Waveguide Magneto-optic Isolator", Applied Physics Letters, vol. 56, pp. 426–428.

R. Wolfe et al., "Thin–film Garnet Materials with Zero Linear Birefringence for Magneto-optic Waveguide Devices", Journal of Applied Physics, vol. 63, 1988, pp. 3099–3103.

G. A. Prinz, "Hybrid Ferromagnetic–Semiconductor Structures", Science, vol. 250, 1990, pp. 1092–1097.

M. McGlashan-Powell et al., "Magneto-optic Waveguide Hysteresis Loops of Planar Magnetic Garnet Films", Journal of Applied Physics, vol. 66, 1989, pp. 3342–3347.

E. Yablonovitch et al., "Epitaxial Liftoff Technology for OEIC's", American Institute of Physics, American Vacuum Society Series 10, Conference Proceedings, 1991, pp. 154–156.

D. I. Bardos, Journal of Applied Physics, vol. 40, 1969, pp. 1371–1372.

Primary Examiner—Frank Gonzalez
Attorney, Agent, or Firm—Brumbaugh, Graves, Donohue & Raymond

[57] ABSTRACT

In a polarization rotator device, a thin-film magneto-optic medium is magnetized by a thin-film magnet. To serve as an optical isolator, the device may include polarizers. In such an optical isolator, in which the magneto-optic medium was formed as a Bi-YIG triple-layer structure, and the thin-film magnet as a single-crystal iron-cobalt layer, an extinction ratio better than −20 dB was realized.

44 Claims, 3 Drawing Sheets

THIN-FILM MAGNETO-OPTIC POLARIZATION ROTATOR

BACKGROUND OF THE INVENTION

This invention relates to magneto-optic polarization rotator structures which are suitable for inclusion in thin-film integrated optical devices.

When placed between a polarizer and an analyzer, a polarization rotator can serve as an optical isolator, e.g., for isolating a semiconductor radiation source from radiation reflected in an optical communications system. A magneto-optic polarization rotator may include a magnetic garnet medium, e.g., of single-crystal yttrium iron garnet ("YIG", $Y_3Fe_5O_{12}$), magnetized in the direction of light propagation. For use in guided-wave integrated optics, for example, a rotator medium is preferably formed as a thin film on a substrate.

Background documents for the invention are reviewed as follows:

U.S. Pat. No. 5,031,983, "Apparatus Comprising a Waveguide Magneto-optic Isolator" issued Jul. 16, 1991 to J. F. Dillon et al. discloses an optical waveguide isolator including a magnetic medium in an applied magnetic field. The waveguide is formed as a multi-layer film of modified bismuth yttrium iron garnet (Bi-YIG) on a substrate of gadolinium gallium garnet ("GGG", $Gd_3Ga_5O_{12}$).

U.S. Pat. No. 4,712,855, "Planar Optical Waveguide and Method of Manufacturing Same", issued Dec. 15, 1987 to W. F. M. Tolksdorf et al. discloses a multi-layer waveguide structure in which the propagation of undesired modes is inhibited. The layers are made of modified yttrium iron garnet materials.

U.S. Pat. No. 3,860,325, "Electric Field Displacing Type Optical Isolator", issued Jan. 14, 1975 to S. Matsushita et al. discloses an optical isolator based on displacement of the light path in a transverse magnetic field. With a suitably placed absorbing medium, light traveling in a waveguide in one direction is absorbed to a greater degree as compared with light traveling in the opposite direction.

U.S. Pat. No. 4,973,119, "Optical Waveguide Isolator" issued Nov. 27, 1990 to K Taki discloses a magneto-optic isolator including a multi-layer mode converter on a substrate. The converter is magnetized perpendicular to the direction of light propagation.

The paper by K. Matsuda et al., "Magnetless Faraday Rotator of $(BiY)_3Fe_5O_{12}$ Waveguide with Strip Magnetic Domains", Applied Physics Letters, Vol. 59, 1991, pp. 507–509 discloses a polarization rotator without a magnet, with striped magnetic domains in a Bi-YIG transmission medium.

The paper by R. Wolfe et al., "Etch-tuned Ridged Waveguide Magneto-optic Isolator", Applied Physics Letters, Vol. 56, 1990, pp. 426–428 discloses chemical etching of a triple-layer Bi-YIG film to reduce the linear birefringence in a polarization rotator, for enhanced blocking of reflected light in a magneto-optic isolator.

The paper by R. Wolfe et al., "Thin-film Garnet Materials with Zero Linear Birefringence for Magneto-optic Waveguide Devices" Journal of Applied Physics, Vol 63, 1988, pp. 3099–3103 describes causes of birefringence in epitaxial films and means for compensation.

The paper by G. A. Prinz, "Hybrid Ferromagnetic Semi-conductor Structures" Science, Vol 250, 1990, pp 1092–1097 discloses the fabrication of single-crystal films of iron and iron alloys on semiconductor substrates.

The paper by M. McGlashan-Powell et al., "Magneto-optic Waveguide Hysteresis Loops of "Planar" Magnetic Garnet Films" Journal of Applied Physics, Vol 66, 1989, pp 3342–3347 discloses a nearly in-plane easy axis of magnetization for Bi-YIG epitaxial layers.

The paper by E. Yablonovitch et al. "Epitaxial Lift-off Technology for OEIC's", American Institute of Physics, American Vacuum Society Series 10, Conference Proceedings, 1991, pp. 154–156 discloses a lift-off technique for transferring an epitaxially grown film from one substrate onto another.

The paper by D. I. Bardos, Journal of Applied Physics, Vol. 40, 1969, pp. 1371–1372 reports on hysteresis studies of iron-cobalt alloys.

Described polarization rotators and magneto-optical isolators use large magnets or solenoids to produce a magnetic field for magnetizing a magneto-optic medium. Such magnetic-field sources are not suited for integrated optics applications.

SUMMARY OF THE INVENTION

A polarization rotator device including a thin-film magneto-optic medium is provided with a thin-film magnet for magnetizing the medium.

DETAILED DESCRIPTION OF PREFERRED EMBODIMENTS

Figure 1:
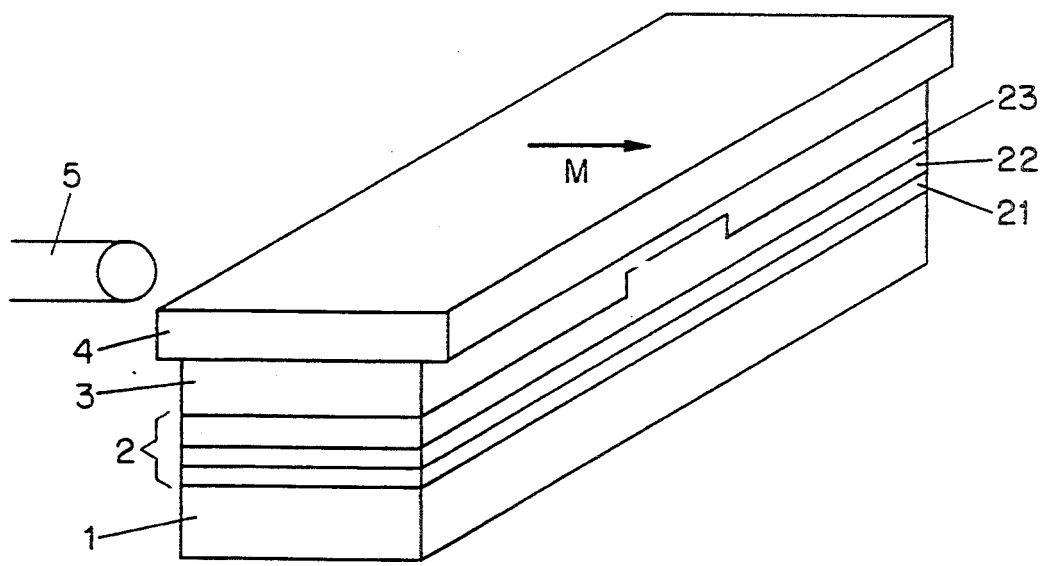
FIG. 1 is an enlarged perspective of a preferred first embodiment of the invention.

FIG. 1 shows substrate 1, magneto-optic waveguide layer structure 2, dielectric buffer layer 3, magnet layer 4, and polarization-maintaining optical fiber 5. Waveguide layer structure 2 comprises layers 21, 22 and 23, the latter with a wave-guiding ridge. Magnet layer 4 is magnetized in the direction M parallel to the waveguide ridge. Inclusion of buffer layer 3 is preferred in the interest of minimizing absorption of light by a (metallic) magnet layer.

Figure 2:
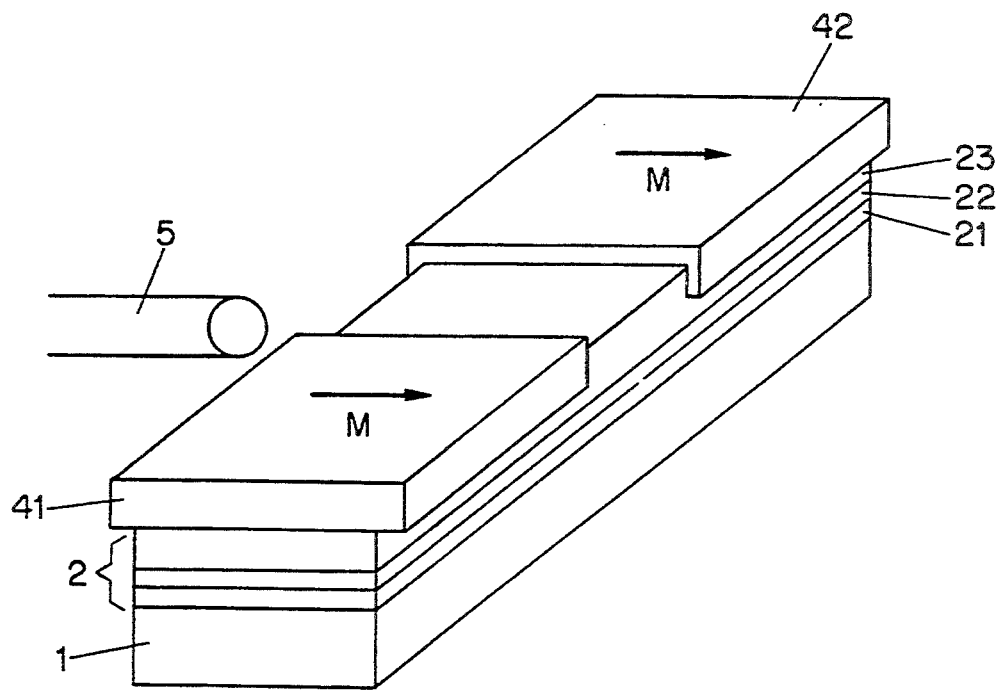
FIG. 2 is an enlarged perspective of a preferred second embodiment of the invention.

FIG. 2 shows substrate 1, magneto-optic waveguide layer structure 2 with layers 21, 22 and 23, magnet layers 41 and 42, and polarization-maintaining optical fiber 5. Magnet layers 41 and 42 are magnetized in the direction M parallel to the waveguide ridge.

In preferred embodiments, an optical fiber 5 may be butted against waveguide ridge 21, or a focusing lens may be placed between the fiber end and the waveguide ridge. Optical fibers used in the fields of fiber-optical communications and opto-electronics typically are optimized for transmission at wavelengths of approximately 1.3 or 1.55 μm. Materials and dimensions of devices of the invention can be chosen correspondingly.

A waveguide layer or layer structure may be grown or deposited epitaxially, on a device substrate. Alternatively, a waveguide layer may be grown on an auxiliary substrate, detached from the auxiliary substrate, and grafted onto a device substrate; see, e.g., the paper by E. Yablonovitch et al. identified above. Such so-called epitaxial lift-off processing can be used for adhering an optical waveguide film to a silicon substrate, for example.

Magnet layers may be made in single-crystal or polycrystalline form, by molecular-beam epitaxy (MBE) or electron-beam evaporation, for example. Polycrystalline material may also be formed by sintering a magnetic powder. In the manufacture of a device, a magnet layer may be included as formed directly or as transferred. An adhesive may be used to attach or bond a transferred film.

Suitable magnet materials include single-crystal iron-cobalt, polycrystalline samarium-cobalt, and polycrystalline neodymium-iron-boron. For permanent magnetization, polycrystalline magnet layers are preferably grown in a magnetic field, e.g., by electron-beam evaporation. Such preferred growth results in polycrystalline films in which crystallites have their easy axes of magnetization aligned parallel, at least approximately. Advantageously, such polycrystalline films may have coercivity as large as 15 kG.

Figure 6:
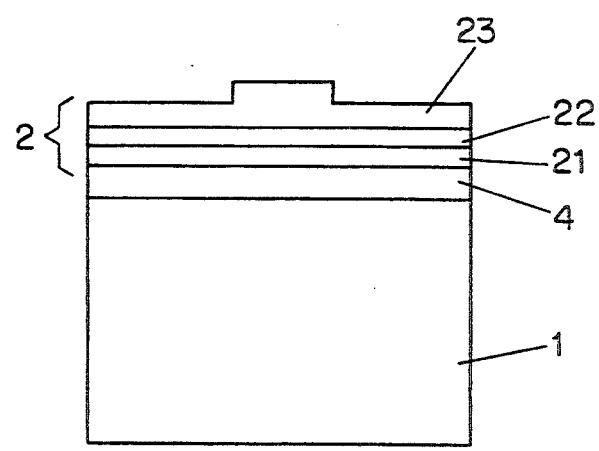
FIG. 6 is a schematic front view of a preferred alternative embodiment of the invention.

Preferably, a magnet layer is placed for magnetic saturation of the magnetic waveguide material. As an alternative to structures illustrated by FIGS. 1 and 2, a magnet layer may be placed between a substrate and a waveguide layer structure instead of on top, e.g., as illustrated by FIG. 6, with feature designations as in FIG. 1. Multiple magnet layers or regions can be included as illustrated in FIG. 2, and such layers can also be included as top and bottom layers to a waveguide layer structure.

Figure 3:
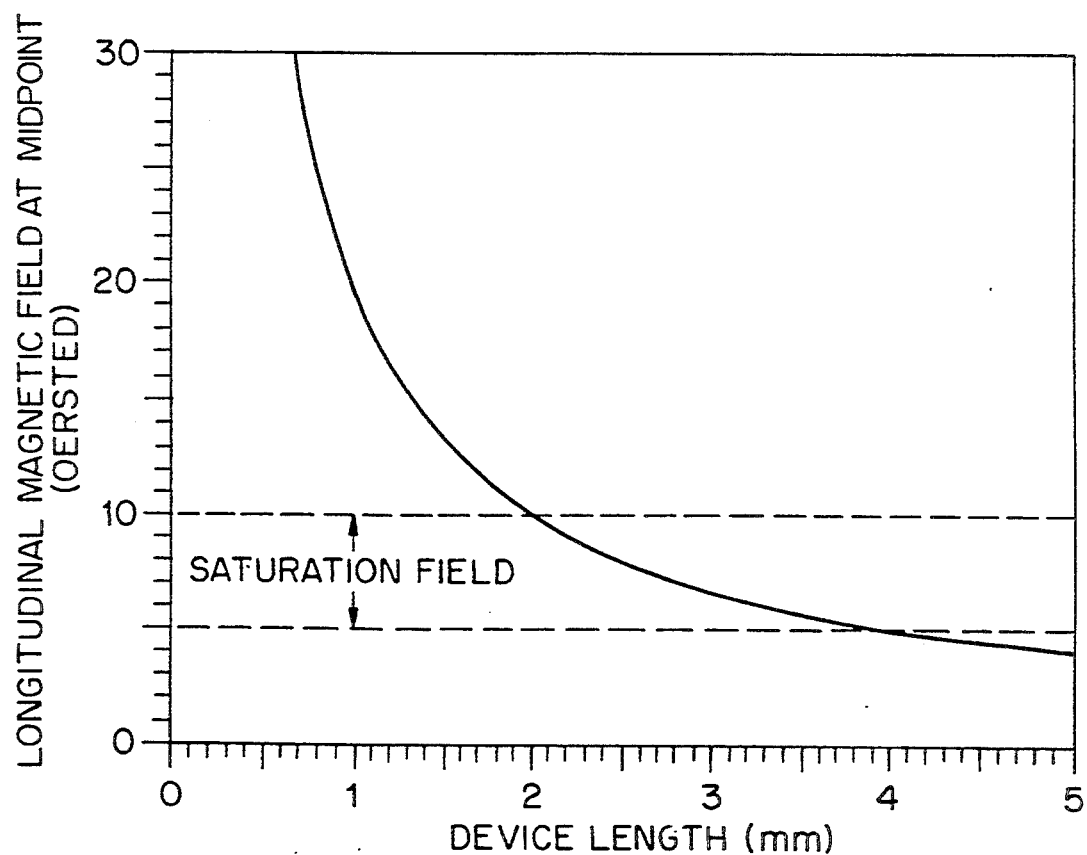
FIG. 3 is a graph of longitudinal magnetic field strength (in oersteds) for idealized embodiments of the invention as a function of their length (in millimeters)
Figure 4:
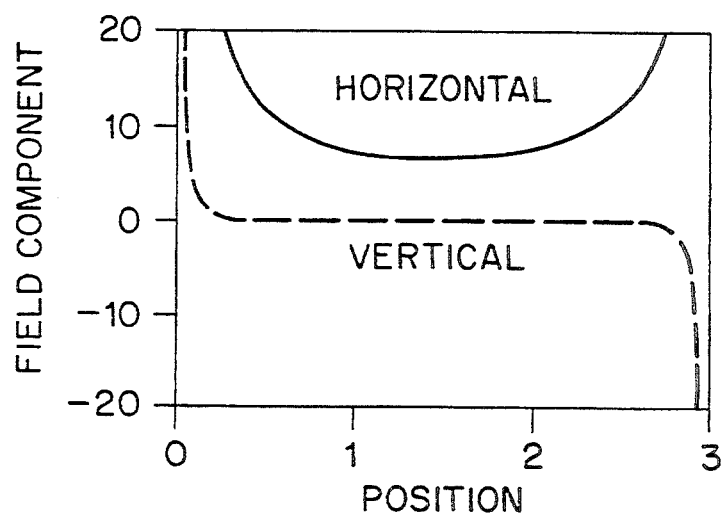
FIG. 4 includes graphs of horizontal and vertical magnetic-field component strengths (in oersteds) as a function of position (in millimeters) along the longitudinal direction of an idealized embodiment of the invention having a length of 3 millimeters.

The graphs of FIGS. 3 and 4 were produced on the basis of theoretical derivations for an iron-cobalt magnet film having a remanent magnetization (4 πM) of 21,000 oersteds, a thickness of 1.5 μm, and essentially infinite width. Since the magnetic field at the optical waveguide remains essentially unchanged for magnet widths greater than about 1 cm, the latter condition is readily approximated in practice. In FIG. 3 and 4, magnetic-field-strength values are for a position 8 μm below the surface, i.e., typically, well below the waveguide. In the waveguide, typically at positions closer to the surface, even greater magnetic field strengths will be realized.

FIG. 3 shows an inverse relationship between device length and longitudinal or horizontal field strength at the device midpoint, where the horizontal field is weakest (see FIG. 4, solid line). Accordingly, for a magnet layer to produce a field strong enough to saturate the magnetization of a magneto-optic waveguide along its entire length, a device has to be relatively short. On the other hand, a device has to be long enough for sufficient optical activity (Faraday rotation) of the magneto-optic waveguide along the length of the device. Typically, for exemplary waveguide materials, the saturation field strength is between 5 and 10 oersteds approximately. FIG. 3 shows that, for a minimum field strength in the range from 5 to 10 oersteds, magnet length ranges inversely between 2 and 4 mm. The effect of the demagnetizing field due to the magneto-optic waveguide material is generally negligible as compared with the field generated by the film magnet.

The transverse or vertical field component (FIG. 4, broken line) is relevant in that, undesirably, it fosters the formation of magnetic domains in the magneto-optic waveguide material. Accordingly, in the interest of minimizing vertical field strength near the device ends, a magnet should overhang the ends of the waveguide by a small distance of the order of 10 μm or more. Small vertical fields along the waveguide generally do not have an adverse effect on device performance for exemplary waveguide materials with an easy axis of magnetization nearly in the plane of a waveguide layer.

Figure 5:
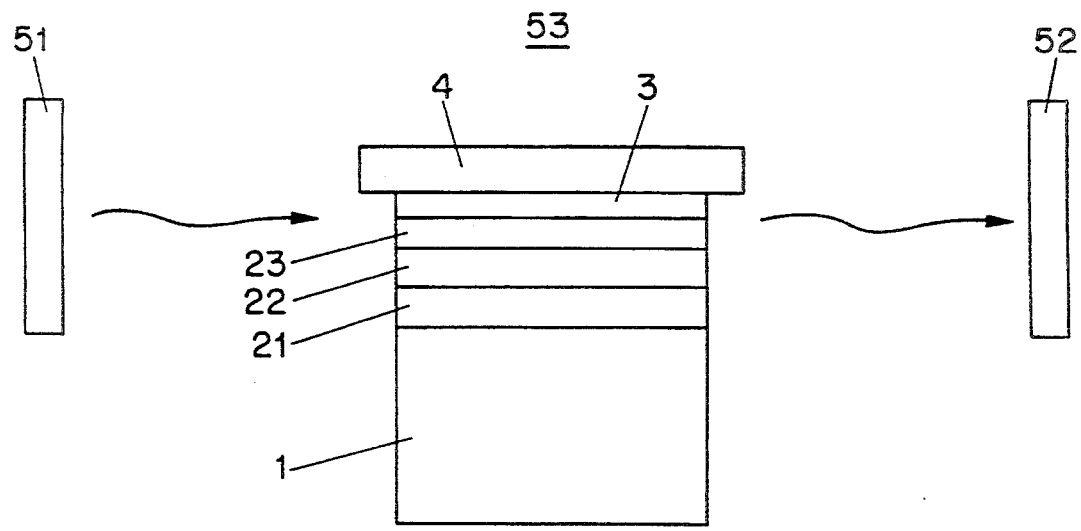
FIG. 5 is a schematic side view of an optical isolator device as preferred in accordance with an embodiment of the invention.

The optical isolator device shown in FIG. 5 includes first and second polarizers 51 and 52 disposed with a 45°-angle between their directions of polarization, and a 45°-degree polarization rotator device 53 between the polarizers.

A further use of the invention is as TE-to-TM mode converter, requiring 90° rotation of polarization over a length magnetically saturated by a thin-film magnet.

EXAMPLE

Bi-YIG triple-layer film waveguides were made as described in the above-identified paper by R. Wolfe et al. (1990), designed to support single TE and TM modes. The films were grown by standard liquid-phase epitaxy on (111)-oriented gadolinium-gallium garnet substrates. The top two layers had nominal composition $(Bi_{0.5}Y_{2.5})(Fe_{3.7}Ga_{1.3})O_{12}$. The films were subjected to annealing and etching procedures as described in the Wolfe papers, for near-planar magnetization anisotropy of the upper layers, and for zero linear birefringence at a wavelength near 1.5 μm. Ridge waveguides were etched parallel to one of the easy axes of magnetization of the Bi-YIG, and a silica layer having a thickness of less than 1 μm was sputtered over the waveguides as a buffer layer and for tuning to zero birefringence at a wavelength near 1.55 μm.

In a magnetic field produced by a bulk magnet, the Faraday rotation in the Bi-YIG films was measured to be 127°/cm at a wavelength of 1.55 μm, so that a waveguide length of 3.55 mm provides 45° rotation. A sample was cut to this length, and its edges were optically polished. With the sample in a magnetic field produced by a bulk magnet, linearly polarized light at 1.55 μm from a DFB diode laser was coupled into one end of a ridge waveguide through a polarization-maintaining single-mode fiber. The light emerging from the other end was collimated with a microscope objective, passed through a metallic thin-film near-infrared analyzer, and detected with a germanium photodetector coupled to a multimeter. The expected 45°-rotation of polarization was observed.

Rectangular (110)-GaAs substrates for iron-cobalt magnet films were cut with different short-side lengths in the $<\bar{1}10>$ direction, and with a 1-cm long side. On the substrates, single-crystal iron-cobalt films were formed by molecular-beam epitaxy, with 30 weight percent iron and 70 weight percent cobalt. Film thickness was 1.5 μm. Such a film has a single easy axis of magnetization along the $<\bar{1}10>$ direction of the substrate and a higher coercivity than a film of pure iron. Hysteresis studies show a flat rectangular response to an applied magnetic field and a coercivity of about 50 oersteds, with a remanent magnetization (4 πM) of about 21,000 oersteds.

Experimental rotator devices were made, each by placing two or three fully magnetized substrate-supported iron-cobalt magnet films in series to form an essentially contiguous layer approximately 4 mm long, on top of a substrate-supported Bi-YIG ridge waveguide of length 3.55 mm. The magnetization was parallel to the ridge direction, as shown in FIG. 1. Faraday rotation, observed as described above with linearly polarized light, was less than 45°, which shows that the film magnet did not fully saturate the magnetization along the entire length of the waveguide.

The amount of Faraday rotation realized was found to depend on the previous magnetization state of the Bi-YIG. When the Bi-YIG first is poled by an external magnet for clockwise Faraday rotation, and with the film magnet then placed over the optical channel to induce a counterclockwise rotation, the observed Faraday rotation was about 30° counterclockwise. This implies saturation of 75 to 90 percent of the length of the waveguide. When, on the other hand, the film magnet was oriented for clockwise rotation, i.e., the same as that of the original poling magnet, the Faraday rotation induced in the waveguide was about 40° after removal of the poling magnet.

The fact that full 45°-rotation was not realized may be ascribed to end effects in the Bi-YIG waveguide. This was verified by placing a 3.3-mm iron-cobalt magnet film at an angle to the waveguide axis, to produce an effect corresponding to an overhang of about 50 to 100 μm at each end of the waveguide. As a result, with increased magnetic field strength at the device ends, 45°-rotation was realized.

Full saturation of the magnetization in a waveguide material having similar saturation field strength as the material used in the present example may be realized with a shorter waveguide, having a length in the range from 1 to 3 mm. For such lengths, to maintain 45° polarization rotation, increased specific Faraday rotation is required. Suitable Bi-YIG waveguides with such increased specific Faraday rotation, capable, e.g., of 45°-rotation in 1 to 3 mm, can be produced by increasing the bismuth content in the waveguide layer.

To measure an effective isolation ratio for an experimental magneto-optic isolator, the magnet-piece set was placed with its direction of magnetization parallel to the waveguide ridge, and the analyzer was positioned at the extinction angle for this geometry. After measuring the power transmitted through the analyzer, the magnet-piece set was rotated 180° so that the magnetization was oriented antiparallel to the original direction of magnetization, and the transmitted power was measured again. The light through the analyzer was then close to a maximum. Following R. Wolfe et al. (1990), the ratio of the detected intensities for the two magnetization directions was taken as the isolation ratio for the ridge waveguide isolator. The value obtained was 1 to 120, corresponding to an isolation ratio of −21 dB. Attenuation due to less-than-45° Faraday rotation was measured at about −1 dB, which can be essentially eliminated by shortening the length of the isolator as described above.

We claim:

1. Optical apparatus comprising:
   a thin-film optical waveguide comprising a magneto-optic layer and having a preferred direction of light propagation; and
   a thin-film magnet layer, permanently magnetized with a substantial component in the preferred direction of light propagation, and disposed sufficiently close to the waveguide to saturate the magnetization of at least a portion of the magneto-optic layer, for rotating the polarization of light propagating in the optical waveguide.

2. The apparatus of claim 1, wherein the magnetically saturated portion carries most of the optical power.

3. The apparatus of claim 1, wherein the magnet layer extends past the magneto-optic layer in at least one of the direction of light propagation and the direction opposite to the direction of light propagation.

4. The apparatus of claim 1, wherein the magnet layer and the waveguide layer are supported by a common substrate.

5. The apparatus of claim 4, wherein the waveguide layer is between the substrate and the magnet layer.

6. The apparatus of claim 4, wherein the magnet layer is between the substrate and the waveguide layer.

7. The apparatus of claim 4, comprising a plurality of magnet layers.

8. The apparatus of claim 1, further comprising a buffer layer between the magnet layer and the waveguide layer.

9. The apparatus of claim 1, wherein the magnet layer is grown epitaxially.

10. The apparatus of claim 9, wherein the magnet layer is placed by epitaxial lift-off processing.

11. The apparatus of claim 1, wherein the magnet layer is polycrystalline, with crystallites having easy axes of magnetization which are aligned substantially parallel to each other.

12. The apparatus of claim 1, wherein the material of the magnet layer is in single-crystal form.

13. The apparatus of claim 1, wherein the magnet layer is held in proximity of the waveguide layer.

14. The apparatus of claim 13, wherein the magnet layer is attached.

15. The apparatus of claim 13, wherein the magnet layer is bonded.

16. The apparatus of claim 1, wherein the waveguide layer is grown epitaxially.

17. The apparatus of claim 16, wherein the waveguide layer is placed by epitaxial lift-off processing.

18. The apparatus of claim 1, wherein the material of the optical waveguide layer consists essentially of Bi-YIG.

19. The apparatus of claim 1, wherein the material of the magnet layer consists essentially of iron-cobalt.

20. The apparatus of claim 1, wherein the waveguide is formed as a triple-layer structure.

21. The apparatus of claim 1, further comprising first and second polarizers whose polarizing directions form an angle of essentially 45°, disposed relative to the waveguide for optical isolation along the direction of light propagation.

22. The apparatus of claim 21, wherein optical isolation has an extinction ratio of at least −20 dB.

23. A method for making an optical device, comprising:
    forming a layered structure comprising a thin film optical waveguide which comprises a magneto-optic layer having a preferred direction of light propagation, and a thin-film magnet layer permanently magnetized with a substantial component in the preferred direction of light propagation and disposed sufficiently close to the waveguide to saturate the magnetization of at least a portion of the magneto-optic layer, for rotating the polarization of light propagating in the optical waveguide.

24. The method of claim 23, wherein the magnetically saturated portion is made to carry most of the optical power.

25. The method of claim 23, wherein the magnet layer is formed extending past the magneto-optic layer in at least one of the direction of light propagation and the direction opposite to the direction of light propagation.

26. The method of claim 23, wherein the magnet layer and the waveguide layer structure are made supported by a substrate.

27. The method of claim 26, wherein the waveguide layer is placed between the substrate and the magnet layer.

28. The method of claim 26, wherein the magnet layer is placed between the substrate and the waveguide layer.

29. The method of claim 26, wherein a plurality of magnet layers are formed.

30. The method of claim 23, further comprising placing a buffer layer between the magnet layer and the waveguide layer.

31. The method of claim 23, wherein the magnet layer is grown epitaxially.

32. The method of claim 31, wherein the magnet layer is placed by epitaxial lift-off processing.

33. The method of claim 23, wherein the magnet layer is polycrystalline, with crystallites having easy axes of magnetization which are aligned substantially parallel to each other.

34. The method of claim 23, wherein the material of the magnet layer is in single-crystal form.

35. The method of claim 23, wherein the magnet layer is held in proximity of the waveguide layer.

36. The method of claim 35, wherein the magnet layer and the waveguide layer are mutually attached.

37. The method of claim 35, wherein the magnet layer and the waveguide layer are mutually bonded.

38. The method of claim 23, wherein the waveguide layer is grown epitaxially.

39. The method of claim 38, wherein the waveguide layer is placed by epitaxial lift-off processing.

40. The method of claim 23, wherein the material of the optical waveguide consists essentially of Bi-YIG.

41. The method of claim 23, wherein the material of the magnet layer consists essentially of iron-cobalt.

42. The method of claim 23, wherein the waveguide is formed as a triple-layer structure.

43. The method of claim 23, further comprising forming first and second polarizers whose polarizing directions form an angle of essentially 45°, disposed relative to the waveguide for optical isolation along the direction of light propagation.

44. The method of claim 43, wherein optical isolation has an extinction ratio of at least −20 dB.

* * * * *

UNITED STATES PATENT AND TRADEMARK OFFICE
CERTIFICATE OF CORRECTION

PATENT NO.  : 5,408,565
DATED       : April 18, 1995
INVENTOR(S) : Miguel Levy et al.

It is certified that error appears in the above-indentified patent and that said Letters Patent is hereby corrected as shown below:

Col. 1, before line 5, insert -- The United States Government has certain rights in this invention pursuant to Contract CDR-881111 awarded by the National Science Foundation. --

Signed and Sealed this

Eighteenth Day of June, 1996

Attest:

BRUCE LEHMAN

*Attesting Officer*    *Commissioner of Patents and Trademarks*